United States Patent [19]
Wada et al.

[11] Patent Number: 4,950,054
[45] Date of Patent: Aug. 21, 1990

[54] LENS POSITION CONTROL DEVICE

[75] Inventors: Hiroyuki Wada; Naoya Kaneda; Masahide Hirasawa; Hirofumi Suda, all of Kanagawa, Japan

[73] Assignee: Canon Kabushiki Kaisha, Tokyo, Japan

[21] Appl. No.: 359,388

[22] Filed: May 31, 1989

[30] Foreign Application Priority Data

Jun. 1, 1988 [JP] Japan .................. 63-135903

[51] Int. Cl.⁵ ............................................ G02B 15/00
[52] U.S. Cl. ...................................... 350/429; 354/400; 358/227
[58] Field of Search ............... 350/429, 423, 255, 430; 354/400, 403, 409; 358/225, 227; 250/231 SE

[56] References Cited
U.S. PATENT DOCUMENTS

| | | | |
|---|---|---|---|
| 4,735,494 | 4/1988 | Makino et al. | 350/429 |
| 4,777,504 | 10/1988 | Akada et al. | 354/409 |
| 4,783,676 | 11/1988 | Aihara et al. | 354/400 |
| 4,816,856 | 3/1989 | Hamada et al. | 354/400 |

Primary Examiner—Bruce Y. Arnold
Assistant Examiner—Loha Ben
Attorney, Agent, or Firm—Fitzpatrick, Cella, Harper & Scinto

[57] ABSTRACT

A position control device for a lens system, the system including a variator and a compensator the latter of which also serves as the focusing lens, comprising device for detecting the degree of focus, device for detecting the positions of the variator and compensator, device for controlling movement of the compensator in accordance with at least the output of the position detecting device, and device responsive to occurrence of an out-of-focus state for correcting the manner in which the control device controls movement of the compensator, whereby the correcting device varies the manner between when the variator moves from the telephoto side to the wide-angle side and when from the wide-angle side to the telephoto side.

10 Claims, 7 Drawing Sheets

WIDE-ANGLE ← → TELEPHOTO

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| A | 1 | 1 | 1 | 1 | 1 | 1 | 1 | 1 | 0 | 0  | 0  | 0  | 0  | 0  | 0  | 0  |
| B | 0 | 0 | 0 | 0 | 1 | 1 | 1 | 1 | 1 | 1  | 1  | 1  | 0  | 0  | 0  | 0  |
| C | 0 | 0 | 1 | 1 | 1 | 1 | 0 | 0 | 0 | 0  | 1  | 1  | 1  | 1  | 0  | 0  |
| D | 0 | 1 | 1 | 0 | 0 | 1 | 1 | 0 | 0 | 1  | 1  | 0  | 0  | 1  | 1  | 0  |

LENS POSITION CONTROL DEVICE

BACKGROUND OF THE INVENTION

1. Field of the Invention

This invention relates to control devices for movable lenses and, more particularly, to control devices for zoom lenses.

2. Description of the Related Art

Zoom lenses having (1) a focusing function, and (2) a function for compensating for the image shift during zooming, where both functions are performed by one and the same lens group or compensator, have been proposed, for example, in Japanese Patent Publication No. Sho 52-15226 or Japanese Patent Publicatin No. Sho 56-47533. In such a zoom lens, unlike the zoom lens of the type in which the above-described two functions are performed by respective individual lens groups, it becomes possible to minimize the size of the lens system and to shorten the minimum object distance.

In the above-mentioned Japanese Patent Publication No. Sho 52-15226, based on the position information of the variator lens group, a position to which the compensator lens group has to move is determined by the computing treatment.

Meanwhile, in the above-mentioned Japanese Patent Publication No. Sho 56-47533, the defocusing resulting from the change of the image magnification is sensed by the automatic focus detector to effect the adjustment of the compensator lens group.

By the way, the inventions of the above-mentioned publications would have no problem if the aforesaid treatment were performed in real time. But, it takes a good deal of time. Therefore, particularly when zooming, immediate response of the compensator to the actuation of the variator cannot be permitted to occur, thereby making it difficult to sustain the in-focus state.

On this account, Japanese Laid-Open Patent Application No. Sho 62-296110 discloses a technique of compensating for this response delay of the automatic focus detector. According to that document, a plurality of zones defined by the position relationship of the variator lens and the compensator lens are set, and a unit movement amount of the compensator lens for every one of these zones corresponding to a predetermined movement amount of the variator lens is memorized. Then, on the basis of the position information of the variator lens and the compensator lens at the time when a predetermined movement of the variator lens has been detected, a unit movement amount of the compensator lens is obtained according to the zone to be set by this position information. Further, on the basis of the direction of zooming and the information of blur detected by the automatic focus adjusting device, the above-described unit movement amount is corrected. According to this corrected movement amount, the above-described compensator lens is moved. Thus, the compensation is effected.

However, in such a control method as has been described above, even though, when zooming from the telephoto side to the wide-angle side, a relatively good result is obtained, there is a problem that when zooming from the wide-angle side to the telephoto side, the operation is apt to be unstable and the blur cannot sufficiently be corrected. On the other hand, in order not to produce a blur, a speed of zooming has to be considerably slow.

The above-described problem seems to be attributable to the depth of field. In more detail, while the depth of field is deep on the wide-angle side, the depth of field is shallow on the telephoto side. For zooming from the telephoto side to the wide-angle side, if a blur on the telephoto side lies within the acceptable circle of confusion, the deviation from the accurate zoom curve, even if somewhat larger than the tolerance, causes blurring not to appear with, because the depth of field deepens as the focal length shortens. However, for zooming from the wide-angle side to the telephoto side, even if the blur at the start lies within the acceptable circle of confusion due to the deep depth of field, even a slight deviation from the true zoom curve causes a blurring to appear, as the focal length increases.

Here, it may be considered that the response speed of the automatic focus detection is increased, or the above-described number of divided zones is sufficiently large to correct the blur with a higher accuracy. Yet, there is a limitation. Another problem of cost will arise.

SUMMARY OF THE INVENTION

One aspect of the invention concerns the control of a lens group which performs a function of compensating for the image shift at the time of zooming and a function of adjusting focus, and is intended to provide a lens position control device in which the correction at the time of production of an out-of-focus signal from the focus detecting device is performed on the basis of different correction information depending on the direction of movement of the zoom, so that the correction can be performed accurately.

DETAILED DESCRIPTION OF THE PREFERRED EMBODIMENT

Figure 1:
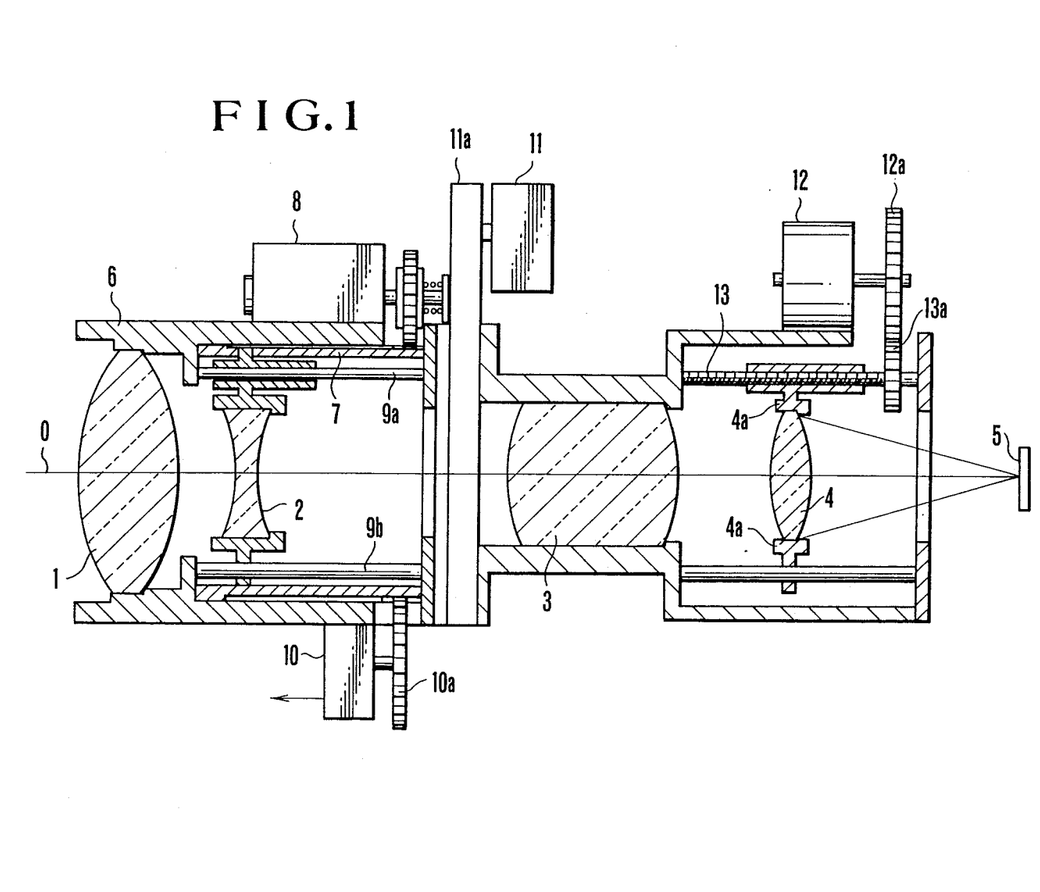
FIG. 1 is a longitudinal section view of a zoom lens system according to the present invention.

FIG. 1 is a longitudinal section view of the zoom lens according to the invention. Reference numerals 1, 2, 3 and 4 constitute a photographic optical system. Particularly, 2 is a variator lens group (hereinafter called the "V" lens group) which performs variation of the image magnification by moving along an optical axis, and 4 is a rear relay lens group (hereinafter called the "RR" lens group) having both the focusing function and the function of compensating for the shift of an image plane resulting from the movement of the V lens group 2, and is positioned closest to the image plane side. 5 is an image sensor such as a CCD; 6 is a lens barrel; 7 is a cam sleeve having camming grooves and being rotated by a drive motor 8 to control and restrict the movement of the V lens group 2; 9a and 9'b are guide bars for guiding the V lens group 2; 10 is an absolute encoder engaged with the cam sleeve 7 by a gear 10a to detect the rotated position of the cam sleeve 7, that is, the absolute position of the V lens group 2, producing outputs representing 16 zones of the zooming range.

Figure 2:
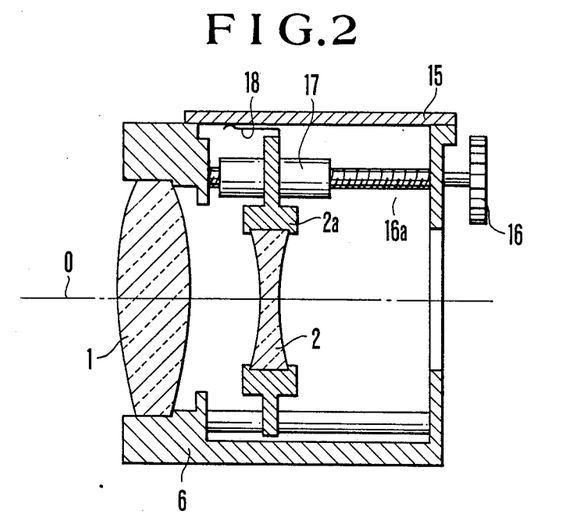
FIG. 2 is a sectional view for explaining a drive mechanism for the variator lens group.
Figure 3:
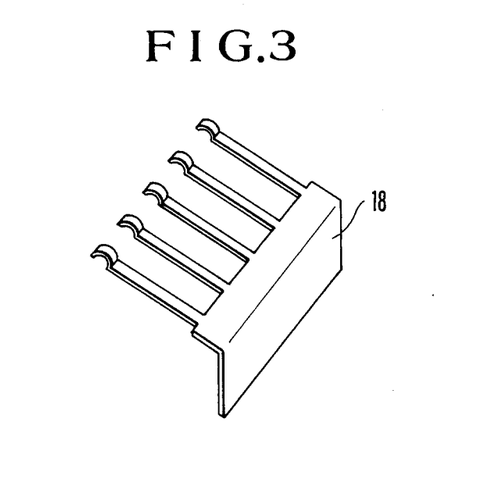
FIG. 3 is a perspective view of a brush for detecting the position of the variator lens group.
Figure 4:
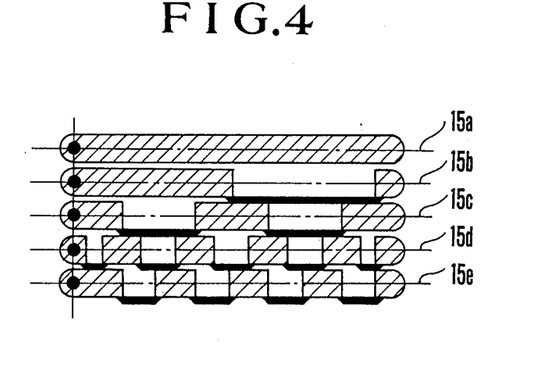
FIG. 4 is a plan view of the layout on the substrate for detecting the position of the variator lens group.
Figure 5:
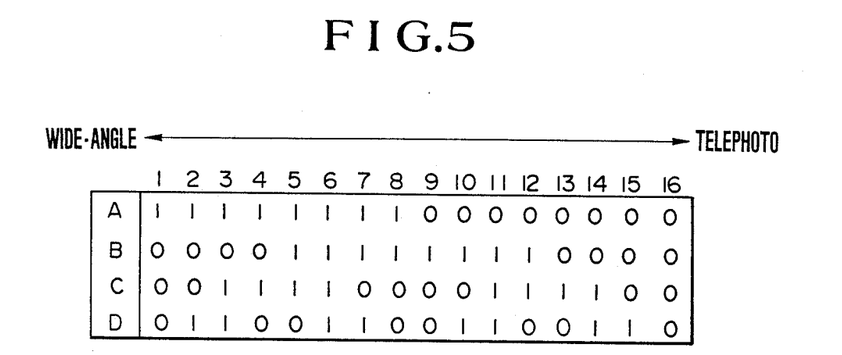
FIG. 5 is a table of the position signals of the variator lens group.

FIG. 2 is a view illustrating another practical example of detecting the absolute position of the V lens group 2. Incidentally, as to the same reference numerals, the same functions are fulfilled. 16 is a gear for receiving the drive output of the drive motor 8. The gear 16 has its shaft formed with screw threads 16a likewise as a moving mechanism of the RR lens group 4 and the shaft meshes with a moving member 17 formed in unison with a moving lens holding member 2a. A brush 18 shown in FIG. 3 is fixedly secured to the lens holding member 2a, while a Gray code board 15 having electrode patterns 15a to 15e shown in FIG. 4 is provided on the inner side of the lens barrel 6. When each brush terminal slides on the Gray code board 15, the absolute position of the V lens group 2 can be detected. In the present embodiment, the range of variation of the image magnification is divided into sixteen zones. Incidentally, a pattern 15a of the substrate electrode patterns represents a ground. Also, FIG. 5 shows the 16-divided code outputs.

Returning to FIG. 1, 11 is a diaphragm drive motor for operating a publicly known diaphragm mechanism 11a. 12 is a pulse motor for moving the RR lens group 4. 13 is a guide bar for guiding the RR lens group 4, having a screw-like groove formed therein and being rotated through a drive gear 12a of the pulse motor 12 to move the holding member 4a of the RR lens group 4 along the optical axis.

Now, in the optical system according to the invention, the lens system called the "rear focus zoom" (in which the focusing function and the compensating function are performed by one compensating lens group (RR lens group), as is different from the conventional common zoom lens system), that is, the lens system in which there are a focusing lens group and a compensator lens group disposed so that the locus of movement of the compensator lens group can unequivocally be determined, the movement of the compensating lens group depicts different loci according to the various object distances.

Figure 6A:
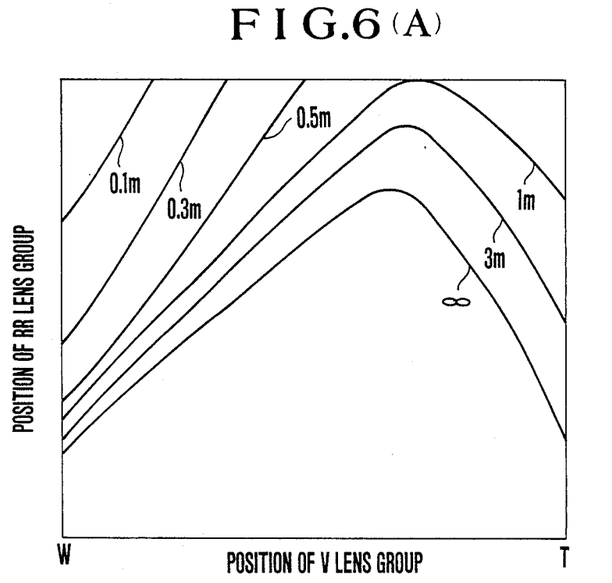
FIGS. 6(A) and 6(B) are graphs of object distance dependent curves of movement of the variator lens group and the rear relay lens group of the optical system according to the invention.

This condition is shown in FIG. 6(A). The position of the V lens group, that is, the focal length, is taken in the abscissa, and the position of the RR lens group is taken in the ordinate. Incidentally, W at the left end represents the wide-angle end, and T at the right end represents the telephoto end. As is understood from this figure, the locus of movement of the RR lens group varies depending on the object distance.

Figure 6B:
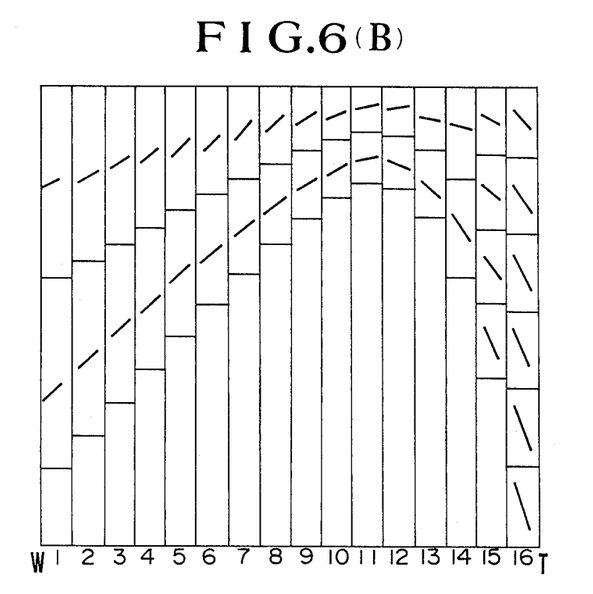

In a case where the automatic focus detecting device has actually been installed in the zoom lens having such a feature, because the automatic focus detecting device takes more than a little time in treatment, it becomes difficult to move the RR lens group 4 to follow up in real time fashion the continuous movement of the V lens group 2 during zooming while maintaining the in-focus state. Therefore, in the present embodiment, with such a problem in mind, according to the characteristic curves shown in FIG. 6(A), the total movement of the V lens group 2 is divided into a plurality of zones as shown in FIG. 6(B) and representative speeds of the RR lens group 4 are previously memorized by each zone. Incidentally, a premise is laid that when zooming, the moving speed of the V lens group 2 is constant. Also, in the present embodiment, these zones are sixteen in number, and the sixteen divided zones correspond to the sixteen divided zones of the above-described position detecting device for the V lens group 2. Therefore, if the in-focus state is preserved before the start of zooming, the moving speed of the RR lens group 4 is determined from the V lens group 2, the RR lens group 4 and the zooming direction. In principle, therefore, the response delay of the automatic focus detecting device can be compensated for.

Figure 7:
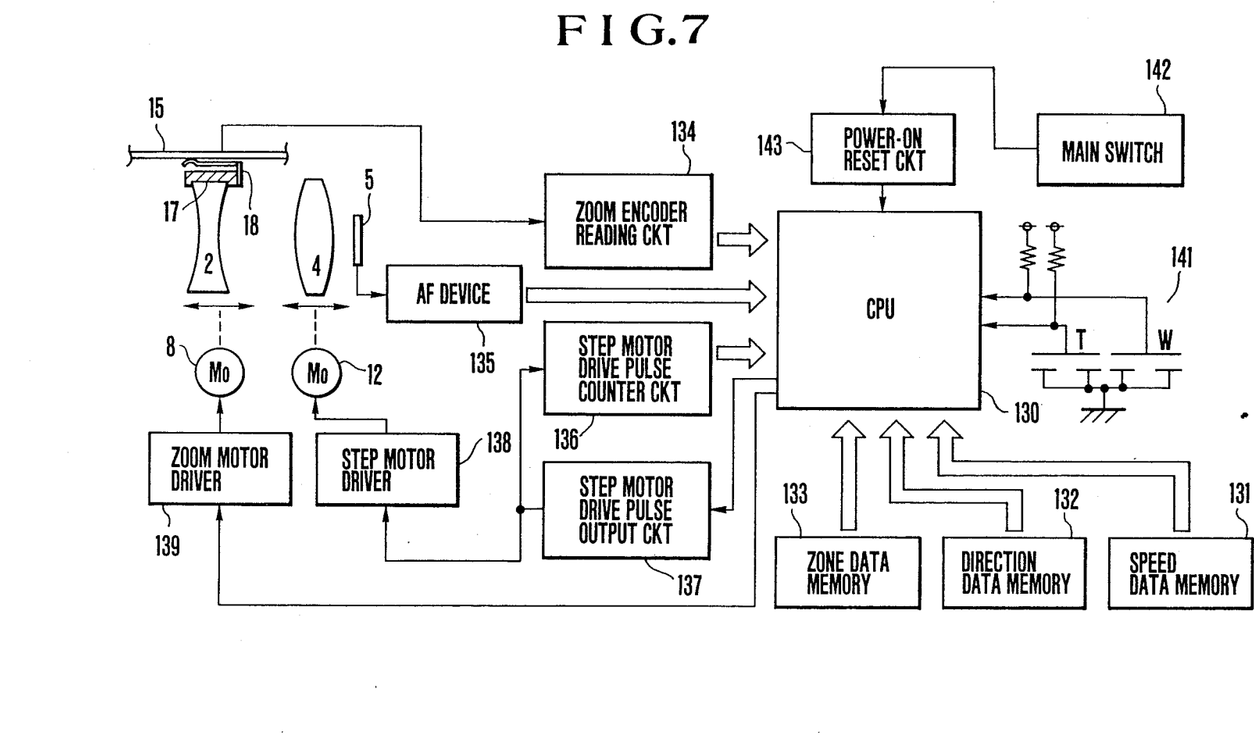
FIG. 7 is a block diagram illustrating the control of the invention.

FIG. 7 is a diagram of an electric circuit diagram to be combined with FIG. 1. When a main switch 142 is turned on, the step motor 12 is reset to a "0" address by a power-on reset circuit 143.

141 is a zoom actuation detecting portion. When a zoom switch (T, W) is manipulated, zooming information is transmitted to a CPU 130. In the CPU 130, the fact that the zoom switch (T, W) has been actuated becomes trigger, so that the position of the V lens group 2 is sensed by the brush 18 and the substrate 15 and is transmitted by a zoom encoder reading circuit 134 to the CPU 130. Also, a step motor drive pulse counter circuit 136 counts what number of pulses the present position of the step motor 12 lies from the 0 reset position and it is transmitted to the CPU 130. These two items of position information are compared with numerical values in a zone data memory 133. From this comparison, a zone is discriminated. From a speed data memory 131, a speed representative of that zone is then read out. Further, depending on whether the actuation of the zoom switch (T, W) of the zoom actuation detecting portion 141 is in the direction from the wide-angle side to the telephoto side or in the direction from the telephoto side to the wide-angle side, the direction of rotation of the step motor 12 is read from a direction data memory 132 into the CPU 130. In the CPU 130, the direction of movement and the speed of the step motor 12 for driving the RR lens group 4 are determined from the contents read from these data memories and the blur information read in from an AF device 135 through an image sensor 5, and the drive direction of a motor 8 for driving the V lens group 2 is determined depending on the actuation result of the zoom switch (T, W). After that, an output to a step motor drive pulse output circuit 137 and an output to a zoom motor driver 139 are produced so that the two motors 12 and 8 move almost simultaneously.

Figures 8A, 8B:
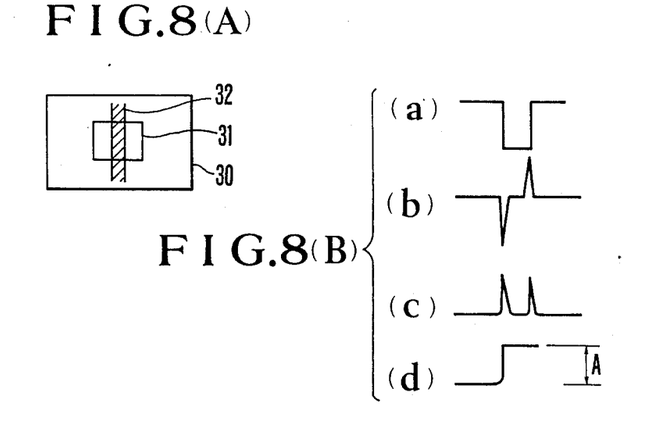
FIGS. 8(A), 8(B) and 8(C) are diagrams for explaining the principle of the focus detecting device according to the invention.
Figure 8C:
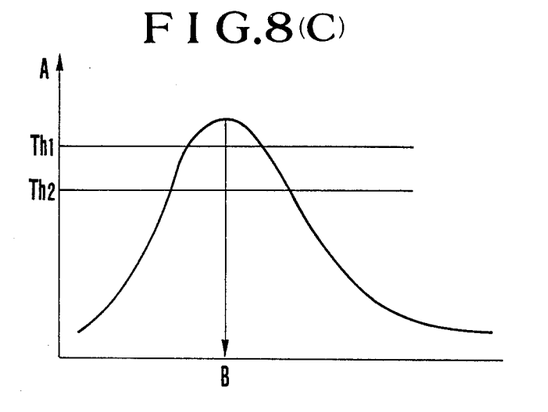

Next, an automatic focus detecting method suited to the lens position control device according to the invention is described on the basis of FIGS. 8(A), 8(B) and 8(C).

Reference numeral 30 indicates a whole picture plane of the video camera, and 31 represents a distance measuring area in it. The focus detecting method of the present embodiment is, in principle, to detect the contrast of the image. For example, by treating the output of an image having the contrast shown at 32, the blur amount is detected. Part (a) of FIG. 8(B) shows a video signal of the image 32, and part (b) shows its differentiation wave form. Part (c) shows a wave form obtained by converting the differentiation wave form to the absolute value, and part (d) shows a signal level (evaluation value) A obtained by integrating and holding the absolute value of the wave form. If the image 32 is sharp, a high signal level A is obtained. If it is not sharp, in other words, blurring, the signal level becomes a low value. Therefore, fundamentally, as shown in FIG. 8(C), by detecting the highest position of the signal level A, the position B of the RR lens group 4 which should occur in the in-focus state can be discriminated.

It is to be noted that in the present embodiment, the evaluation value A is compared with each of two threshold value levels $Th_1$ and $Th_2$. Thus, the extent of the blurring is divided into three parts.

Figure 9:
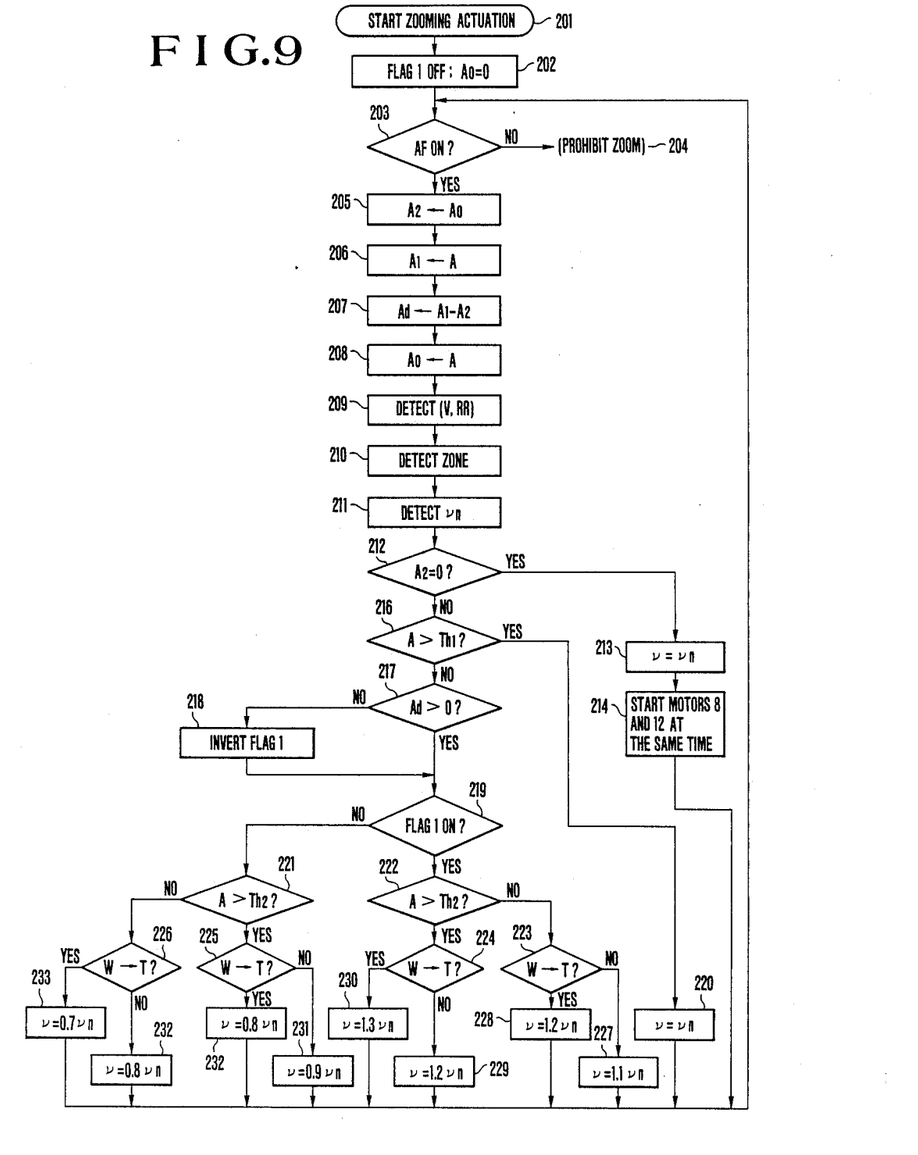
FIG. 9 is a flowchart illustrating the control according to the invention.

Next, the operation according to the present invention is described on the basis of the flowchart shown in FIG. 9. At first, whether or not the automatic focus detection is being carried out is tested in a step 203. If it is not carried out, then because there is a possibility of occurrence of a mere fault that the zooming operation or the movement of the V lens group only causes the image to blur, zooming is prohibited. If the automatic focus detection is being carried out, the value $A_O$ is put into a register $A_2$, and the present evaluation value A to a register $A_1$, where for the first cycle, $A_0=0$ in the step 202. Further the difference between the registers $A_1$ and $A_2$ is stored as a value Ad in a step 207. Then, the present evaluation value A is put into the register $A_0$ in a step 208. Next, the positiones of the V lens group and the RR lens group are detected in a step 209, and the zone is determined from each lens position information in a step 210. Then, the representative speed $vn$ of the determined zone previously stored is read in a step 211, and an output for moving the RR lens group at this zone representative speed is produced. And, in a step 212, whether or not $A_2=0$ is tested. In the first cycle, because $A_0=0$, $A_2=0$. And, the flow proceeds to a step 213, where at the usual zone representative speed, the AF motor 12 (RR lens drive motor) and the zoom motor 8 are started at the same time. Up to here, the first cycle is complete. Then, the flow returns to the step 203. And, the flow repeats the procedure till the step 212. In the second and later cycles, because $A_2 \neq 0$, the routing beginning with a step 216 is executed.

In the step 216, the evaluation value A obtained on the basis of the video signal in the way described above is compared with the first threshold level $Th_1$. If $A > Th_1$, as it implies that the image is in a sufficient in-focus state, the flow proceeds to a step 220 where the RR lens group is moved at the usual zone representative speed. Conversely if $A \leq Th_1$, as it implies that the contrast is not sufficient and the image is out of focus, the RR lens group is moved by a step 217 and those that follow. In the step 217, at first whether the value Ad is positive or negative is tested. The value Ad is the result of the comparison in the evaluation value level between the current cycle and the preceding cycle in the step 207. In a step 219 and those that follow, therefore, the judgment of the increase or decrease of the zone representative speed is carried out. In the second cycle, whether or not the in-focus is approached cannot be determined by the positive or negative sign of the value Ad. Yet, if $Ad > 0$, the flag 1 remains off. Then the flow proceeds to a step 221. In the step 221, whether or not the focus signal level A is larger than the threshold level $Th_2$ is tested. If $A \leq Th_2$, as it implies that the image is sufficiently blurred, after the judgement of the zoom direction in a step 226, "0.8" is chosen in the correction coefficient when zooming from the telephoto side to the wide-angle side, and the representative speed $v$ of the zone determined by each lens position is multiplied by this correction coefficient to decelerate the speed of the RR lens group. Conversely, when zooming from the wide-angle side to the telephoto side, "0.7" is chosen in the correction coefficient. If, in the step 221, $A > Th_2$ is determined, as it implies that the blurring is not so high a level, the correction coefficient is moderated, or "0.9" is chosen when zooming from the telephoto side to the wide-angle side, or "0.8" when zooming from the wide-angle side to the telephoto side. Then the flow returns to the step 203 and the routine described before is performed. That is, the positions of the V and the RR and the zone representative speed are detected, and the sign of the value Ad is examined. In the step 216, the level of the evaluation value is examined. If $A \leq Th_1$, the flow proceeds to the step 217 to examine the sign of the value Ad. Here if $Ad > 0$, as it implies that the evaluation value is higher than that in the preceding cycle, the flag is left unchanged. By doing so, the zone representative speed goes in a direction to decelerate, likewise as in the preceding cycle. Also, if $Ad \leq 0$, the flag 1 is inverted in the step 218. By branching of the step 219, the zone representative speed goes in a direction to accelerate (to the step 222 and those that follow). Even in the step 222 and onward, likewise the step 221 and onward, by the examination of the evaluation value A in respect to the threshold level $Th_2$, and the zoom direction, the correction coefficient is varied to "1.1" to "1.3" when the RR lens group is to move.

As has been described above, according to the embodiment of the invention, for example, when in the state of $A \leq Th_2$, for zooming from the telephoto side to the wide-angle side, the zone representative speed is corrected about 0.8 times, while for zooming from the wide-angle side to the telephoto side, the zone representative speed is corrected about 0.7 times. Also when in the state of $Th_2 \leq A \leq Th_1$, for zooming from the telephoto side to the wide-angle side, the zone representative speed is corrected 0.9 times, while for zooming from the telephoto side to the wide-angle side, the zone representative speed is corrected about 0.8 times.

Therefore, particularly when zooming from the wide-angle side to the telephoto side, it becomes possible to swiftly approach the very desired curve of movement of the RR lens group. It should be noted that as the correction information of this time, such values as to perform zooming smoothly are taken of course.

What is claimed is:

1. A lens position control device comprising:
   (a) a first lens group movable along an optical axis for performing a function of varying an image magnification;
   (b) a second lens group movable along the optical axis for performing a function of compensating at the time of variation of the image magnification and a function of focusing;
   (c) focus detecting means for detecting focus of an image;
   (d) position detecting means for detecting positions of said first lens group and said second lens group;
   (e) control means for controlling movement of said second lens group in accordance with at least position information of said first lens group and said second lens group obtained by said position detecting means; and
   (f) correcting means for performing a correction of the movement of said second lens group by said control means when said focus detecting means indicates out-of-focus, said correcting means varying the correction between at the time of movement of said first lens group from a telephoto side to a wide-angle side and at the time of the movement thereof from the wide-angle side to the telephoto side.

2. A device according to claim 1, wherein said control means has a memory having stored therein movement control information of said second lens group set in accordance with the position information of said first and said second lens groups.

3. A device according to claim 1, wherein said control means has a memory having stored therein moving speed information of said first lens group and movement control information of said second lens group set in accordance with the position information of said first and said second lens groups.

4. A device according to claim 3, wherein a moving speed of said first lens group is a constant speed at a previously set value.

5. A device according to claim 1, wherein said correcting means has the correction at the time of movement of said first lens group from the wide-angle side to the telephoto side set greater than the correction at the time of the movement thereof from the telephoto side to the wide-angle side.

6. A device according to claim 1, wherein said correcting means varies the magnitude of said correction according to a degree of out-of-focus obtained by said focus detecting means, so that the greater said degree of out-of-focus, the greater the magnitude of said correction is made.

7. A device according to claim 6, wherein said correcting means has the correction at the time of movement of said first lens group from the wide-angle side to the telephoto side set greater than the correction at the time of the movement thereof from the telephoto side to the wide-angle side.

8. A device according to claim 1, wherein said control means includes an electric motor serving as a drive source for moving said second lens group, and wherein said correcting means performs said correction by changing a speed of rotation of said motor.

9. A device according to claim 8, wherein said correcting means varies the magnitude of said correction according to a degree of out-of-focus obtained by said focus detecting means, so that the greater said degree of out-of-focus, the greater the magnitude of said correction is made.

10. A device according to claim 9, wherein said correcting means has the correction at the time of movement of said first lens group from the wide-angle side to the telephoto side set greater than the correction at the time of the movement thereof from the telephoto side to the wide-angle side.

* * * * *

UNITED STATES PATENT AND TRADEMARK OFFICE
CERTIFICATE OF CORRECTION

PATENT NO. : 4,950,054

DATED : August 21, 1990

INVENTOR(S) : Hiroyuki Wada, et al.

It is certified that error appears in the above-identified patent and that said Letters Patent is hereby corrected as shown below:

COLUMN 1,
   Line 15, "Publicatin No." should read --Publication No.--.

COLUMN 2,
   Line 9, "appear with," should read --appear,--.

COLUMN 3,
   Line 5, "9'b" should read --9b--.

COLUMN 5,
   Line 26, "positiones" should read --positions--.

Signed and Sealed this

Fourth Day of August, 1992

Attest:

DOUGLAS B. COMER

Attesting Officer

Acting Commissioner of Patents and Trademarks